A. MAGOWAN.
India Rubber Springs.

No. 136,079.  Patented Feb. 18, 1873.

UNITED STATES PATENT OFFICE.

ALLEN MAGOWAN, OF TRENTON, NEW JERSEY.

IMPROVEMENT IN INDIA-RUBBER SPRINGS.

Specification forming part of Letters Patent No. 136,079, dated February 18, 1873.

*To all whom it may concern:*

Be it known that I, ALLEN MAGOWAN, of Trenton, in the county of Mercer and State of New Jersey, have invented an Improvement in India-Rubber Springs, of which the following is a specification:

This invention consists in a spring for car and other purposes, composed of a central cylindrical core of India rubber and surrounding rings of the same material, made circular in their cross-section, whereby is provided a spring having a high degree of elasticity, together with great bearing strength, and which may be manufactured with great economy and consequent cheapness.

Figure 1:
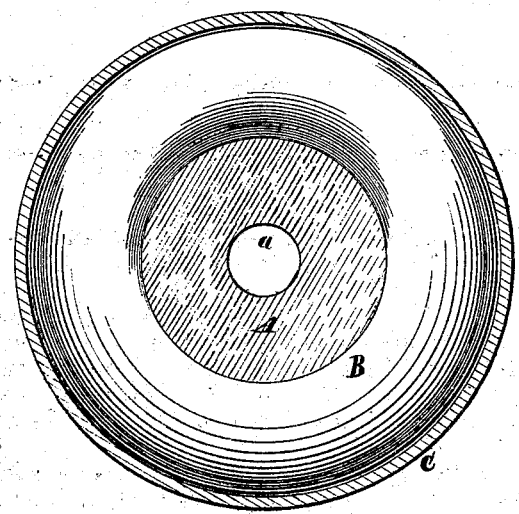
Figure 2:
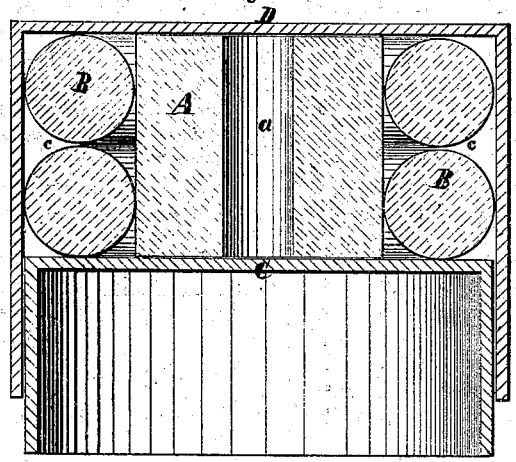

Figure 1 is a sectional plan view of a spring constructed according to my invention. Fig. 2 is a transverse sectional view of the same.

A is a core of India rubber, of any desired or requisite length and diameter, of cylindrical form, and with preferably a central hole or bore, $a$, to permit the inward expansion of the India rubber when longitudinally compressed. Around and concentric with this core, and in contact with the outer or circumferential surface therof, are rings B, also of India rubber. These rings are placed one upon another, as shown in Fig. 1, the upper and lower sides of the two outermost rings being flush with the ends of the core, so that when the spring is placed between two bearing-surfaces, with the rings under little or no compression, the bearing-surfaces will bear both upon the rings and upon the core. Each of the rings is circular in its cross-section—that is to say, in the section given by dividing the ring radially at any point. The spring thus constructed is fitted snugly within a box, D, of greater length or depth than the spring, and arranged to surround the rings B, said box resting at its closed end on the spring. That portion of the sides of this box which extends beyond the spring and terminates in the mouth or open end of the box receives within it a follower, C, of corresponding configuration with the interior of the box, so as to form an opposite bearing for the spring, and so that the interior of the projecting or overlapping sides of the box and the exterior of the sides of the follower, which should be made of sufficient length for the purpose, operate the one to guide the other throughout the entire action of the spring, as the latter is compressed or expanded between the follower and closed end of the box. The follower C may be made hollow and open at its end furthest from the spring, as represented in the drawing.

The spring as a whole thus constructed may be applied with advantage to railway cars, and for other purposes.

What I claim as my invention is—

The combination of the central cylindrical India-rubber core A and the concentric system of India-rubber rings B, circular in their cross or radial section, substantially as and for the purpose specified.

ALLEN MAGOWAN.

Witnesses:
 H. W. JOSLIN,
 LOUIS C. GOSSON.